Jan. 22, 1963 — O. SILBERG — 3,074,453
TIRE CHAIN DEVICE
Filed Aug. 27, 1962

INVENTOR:
OSCAR SILBERG
BY Arthur A Jacobs
ATTORNEY 3,074,453
												   Patented Jan. 22, 1963

3,074,453
TIRE CHAIN DEVICE
Oscar Silberg, Philadelphia, Pa., assignor of forty percent to George M. Ilgas and thirty percent to William Cornia, both of Philadelphia, Pa.
Filed Aug. 27, 1962, Ser. No. 219,449
2 Claims. (Cl. 152—237)

This invention relates to a tire chain for improving the traction of automotive vehicles on snow, ice, mud and the like, and it particularly relates to an improved tire chain of the aforesaid type which is adapted to be strapped directly onto a tire without necessitating jacking up of the vehicle to lift the wheel from the ground.

Tire chains have heretofore been primarily of the type which encompass the entire circumference of the tire so that the wheel must be lifted from the ground in order to wrap the chain around the tire. In order to avoid this, single or double lateral chain units have heretofore been utilized wherein the chain unit was provided with a strap and buckle and the unit could be wrapped around one portion of the periphery of the tire and secured in place by the buckle. This avoided the necessity for lifting the wheel of the vehicle from the ground. However, because of the rotational pressure put on the chain by the rotation of the wheel during motion of the vehicle, these strap units tended to loosen and slip thereby largely destroying their effectiveness.

It is one object of the present invention to provide a strap-type chain unit which eliminates slippage on the tire during use.

Another object of the present invention is to provide a strap-type chain unit of the aforesaid non-slippable nature which is relatively simple in construction, easy to apply and remove and relatively inexpensive to manufacture.

Other objects and many of the attendant advantages of this invention will be readily appreciated as the same becomes better understood by reference to the following description when read in conjunction with the accompanying drawings wherein.

Figure 1:
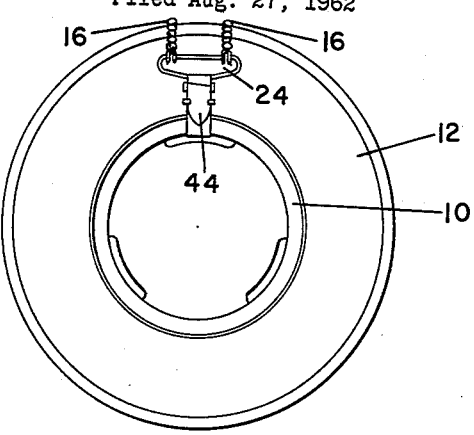
FIG. 1 is a front elevational view of an automobile wheel having a tire on which is mounted a tire chain unit embodying the present invention.

Referring now in greater detail to the various figures of the drawing wherein similar reference characters refer to similar parts, there is shown a wheel 10 having a tire 12 thereon. Mounted on the tire 12 is a chain unit, generally designated 14, embodying the present invention. The unit 14 comprises a pair of chains 16. At one end of each chain is a hook 18 and at the other end of each chain is a hook 20. The hooks 18 are engaged with corresponding slots 22 in a laterally elongated, somewhat oval-shaped metal plate 24. The plate 24 is provided with a forwardly extending integral flange 26 having a pair of oppositely-disposed integral upstanding ears 28, one ear being upstanding from each longitudinal edge of the flange. At the outer or free end of the flange 26 are provided a pair of integrally formed keepers 30, each keeper extending upwardly from the corresponding edge of the flange and then being bent inwardly into partially overlying relationship to the top surface of the flange.

Figure 4:
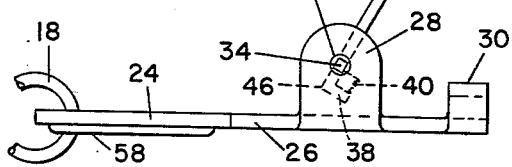
FIG. 4 is a side elevational view of the clamping means of the chain unit with the clamp in the open position.
Figure 5:
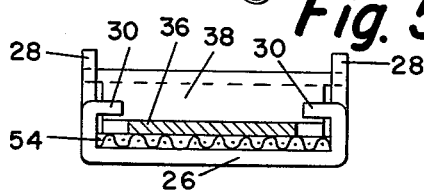
FIG. 5 is a sectional view taken on line 5—5 of FIG. 2.

The ears 28 are each provided with a bearing aperture 32 in which are journaled corresponding lugs or pins 34 laterally extending from the longitudinal edges of a lever 36 to form a pivotal connection for the lever. The rearmost edge of the lever 36 is bent to form a clamping lip 38 having serrations or teeth 40 on its lower edge. The central portion of the lever 36 is curved downwardly, the rear being higher than the front portion (as indicated in FIG. 5) and is provided with a pair of recesses 42, one at each longitudinal edge, to receive the keepers 30 when the lever is lowered from its raised, unlocked position (as in FIG. 4) to its lower, locked position. The free end of the lever 36 is inwardly tapered at both edges to form a handle portion 44.

Figure 2:
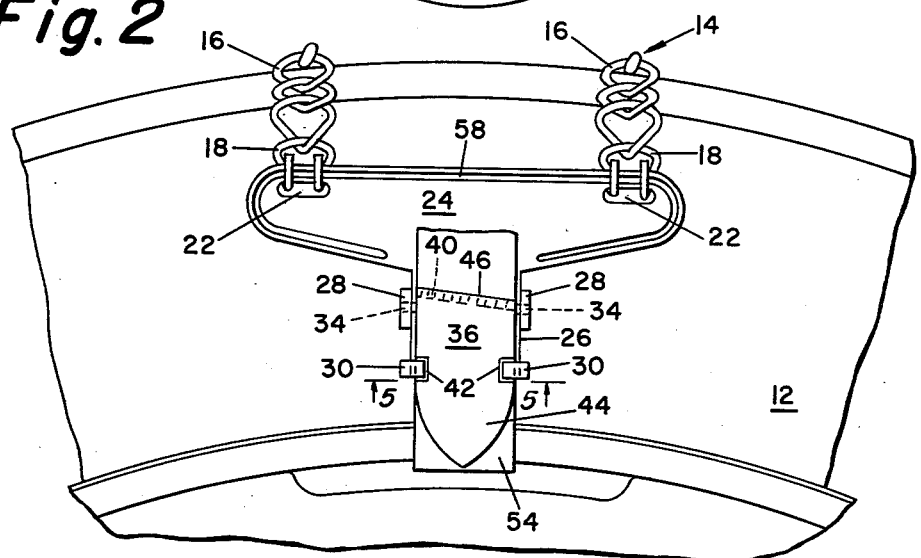
FIG. 2 is a fragmentary, enlarged, detailed front elevational view of the tire and chain unit of FIG. 1.
Figure 3:
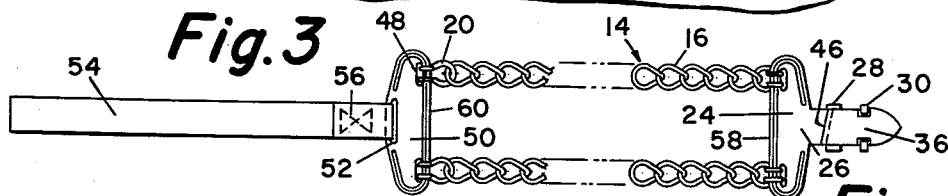
FIG. 3 is a top plan view of the chain unit of FIGS. 1 and 2 in open position.

It should be noted that the rear edge 46 of the lever 36, just above the lip 38, is slanted transversely of the length of the lever (as best shown in FIGS. 2 and 3) for a purpose hereinafter more fully described.

The opposite ends of the chains 16 are connected by means of their hooks 20 to slots 48 in a laterally elongated, somewhat oval-shaped plate 50 generally similar to plate 24. The plate 50 is not provided with a forwardly extending flange as is plate 24 but is provided with a slot 52 in which is looped one end of a strong fabric strap 54, the loop being fastened by stitching or the like as at 56.

Both the plate 24 and the plate 50 are provided with a rib, indicated at 58 for plate 24 and 60 for plate 50. These ribs extend completely across the faces of their respective plates adjacent the inner edges thereof and continue in close parallelism with the outer edges of the plates up to the area of the flange 26 of plate 24 and slot 52 of plate 50.

In operation, the unit is mounted on the tire by draping the chains 16 transversely across the upper periphery of the tire so that the chains extend across the tire tread and the plate 24 is along the front tire sidewall while the plate 50 is along the rear sidewall. In this position, the ribs 58 and 60 are on the underside of their respective plates abutting the corresponding tire sidewalls while the grooves formed by the pressing out of the ribs are uppermost. The strap 54 is then brought down, under and around the tire and wheel rim and its free end is inserted under the lip 38 of the still open lever 36. The strap is then drawn tight so that the ribs 58 and 60 are held in tight frictional engagement with their respective tire sidewalls, and the lever 36 is pivoted down until it is in lowermost position. In lowering the lever 36, because of the slanted edge 46 and offset pivot lugs 34, the teeth 40 of the left hand or higher portion of the lip 38 (as viewed in FIG. 2) engage the strap 54 first and act as a fulcrum for the lowering into engagement of the teeth on the opposite end until those teeth are tightly engaged. As the teeth on the opposite end are engaged, they, in turn, bear the weight of the lever as a fulcrum while the first teeth are raised slightly away from the belt but not completely out of engagement therewith. This provides an effective engagement immediately upon moving the lever down to prevent sliding of the unit on the tire while the fastening of the unit on the tire is completed and, at the same time, provides a certain amount of lateral play between the clamping lip and the strap to take up any sudden tension without snapping.

When the unit is in place, as shown in FIGS. 1 and 2, the ribs 58 are in tight frictional engagement with the sidewalls of the tire and this frictional engagement is sufficient to prevent any tendency to slippage of the unit while the tire is rotating during movement of the vehicle. At the same time, in the preferred embodiment of the invention, the completely linear, unbroken extent of the rib 58 both in the horizontal and angularly curved directions prevents any pinching of the tire sidewalls which might otherwise, under heavy loads and pressures, be sufficient to damage the tire casing.

Obviously many modifications and variations of the present invention are possible in the light of the above teachings. It is, therefore, to be understood that within the scope of the appended claims, the invention may be practiced otherwise than as specifically described.

The invention claimed is:

1. A tire chain unit comprising a pair of flat plates, each plate having an inner edge and an outer edge, at least one chain extending between the inner edges of said plates and connected at its corresponding ends to said plates, said chain being of sufficient length to transversely wrap around the tread portion of a vehicle tire, one of said plates having a flange extending outwardly from its outer edge, a clamping means on said flange, said clamping means comprising a pivot support on said flange, pivot bearings in said support, a lever having a pair of oppositely-disposed pivot lugs, said lugs being offset from each other, one of said lugs being pivotally engaged in one of said bearings and the other of said lugs being pivotally engaged in another of said bearings, and an offset clamping lip depending from an edge of said lever and extending between said lugs, said edge being inclined between said lugs, the other of said plates having a flexible strap extending outwardly from its outer edge, the free end of said strap being engageable by said clamping means, and an elongated rib on each of said plates, said ribs being frictionally engageable with the corresponding sidewalls of the tire when the unit is positioned on the tire with the chain overlying the tread portion, the strap underlying the tire rim and the strap clampingly engaged by the clamping means.

2. A tire chain unit comprising a pair of flat plates, each plate having an inner edge and an outer edge, at least one chain extending between the inner edges of said plates and connected at its corresponding ends to said plates, said chain being of sufficient length to transversely wrap around the tread portion of a vehicle tire, one of said plates having a flange extending outwardly from its edge, a clamping means on said flange, the other of said plates having a flexible strap extending outwardly from its outer edge, the free end of said strap being engageable by said clamping means, and an elongated rib on each of said plates, the rib on each plate extending in an unbroken line in adjacency to the major portion of the periphery of the corresponding plate, said ribs being frictionally engageable with the corresponding sidewalls of the tire when the unit is positioned on the tire with the chain overlying the tread portion, the strap underlying the tire rim and the strap clampingly engaged by the clamping means.

References Cited in the file of this patent
UNITED STATES PATENTS

| | | |
|---|---|---|
| 2,080,636 | Stahl | May 18, 1937 |
| 2,118,576 | Stuller | May 24, 1938 |